Figure 4:
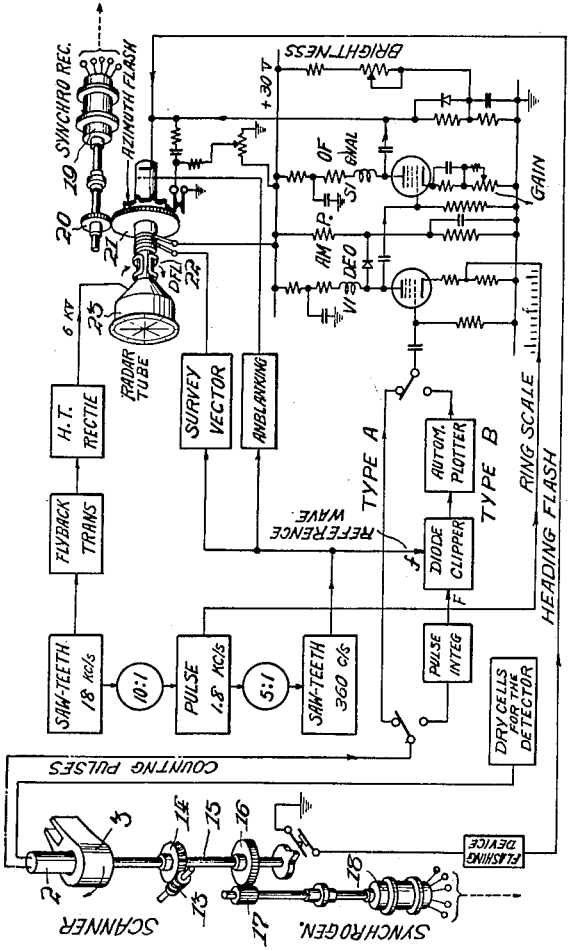

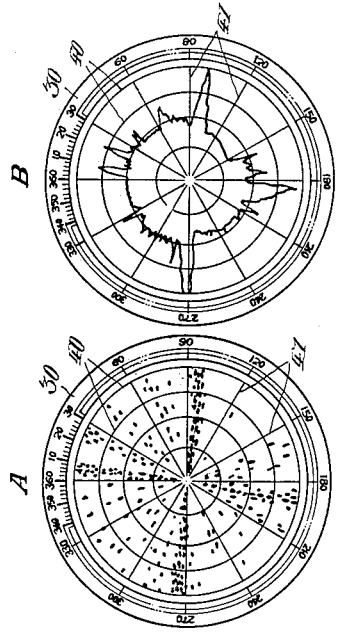
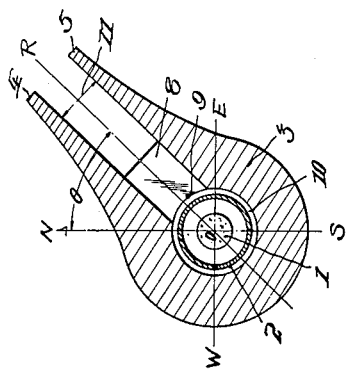
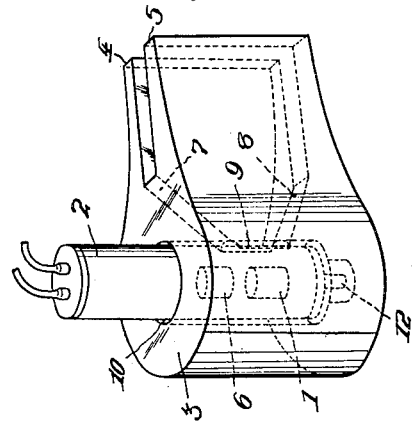

United States Patent Office

3,028,493
Patented Apr. 3, 1962

3,028,493
SURVEYING APPARATUS FOR RADIOACTIVE ORES
Kikuo Takahashi, 97 1-chome, Matsubara-cho
Setagaya-ku, Tokyo, Japan
Filed Feb. 3, 1959, Ser. No. 790,956
Claims priority, application Japan Feb. 5, 1958
2 Claims. (Cl. 250—71.5)

This invention relates to a surveying apparatus to be employed in mining operations of radioactive ores which comprises a fixed vessel containing therein a crystal which becomes luminous upon reception of radioactive rays, an element which changes this luminescence into an electric impulse, and a rotating shield enclosing this fixed vessel with a gap provided on one side to give it directional character so designed that the changes in these impulses are made to appear on the screen of the Braun tube together with the coordinates which indicate the direction and intensity thereof.

The radioactive ray detectors that have heretofore been used such as the Geiger counter, scintillation counter, or the ionization chamber cannot detect the direction of radioactive rays, because they lack directional character. The only exception was the Wilson chamber which by detecting the individual particles of the radioactive ray and by utilizing the ionizing action of its gas was the only one that could indicate the path of the radioactive rays through vapour. Although this was effective as regards $\alpha$-rays and $\beta$-rays, its sensitivity to $\gamma$-rays was very low, and moreover it was confined to the observation of conditions of the instant that the low pressure space was created. And because of its low efficiency, it is unsuitable for exploratory surveying for radioactive ores. In view of this fact, the presently employed method of prospecting for uranium ores consists in groping about in search for spots of great radioactivity by carrying around on foot various types of non-directional counters as mentioned above and measuring the intensity of the radioactivity of a multitudinous number of spots. This is the present state of affairs.

On the one hand, $\alpha$-rays are totally unsuitable for prospecting, and even when $\beta$-rays are utilized, it is only of use in exploring the surface of the earth on account of the low penetrability of $\beta$-rays. While on the other hand, the method in which $\gamma$-rays are employed, due to their great penetrability, do not possess the above defects; however, because of its great penetrability and the resultant piling up of the radioactivity from all directions, it becomes difficult to determine the source of the radioactivity. Nevertheless, with the scintillation crystal generally being far superior in its sensitivity to $\gamma$-rays than the Geiger counter, it is a fact that a transition is occurring to the use of the scintillation counter method.

This invention has as its object the prompt detection of this source of $\gamma$-rays and thereby making the surveying for uranium ores and the like an automatic operation.

Another object of this invention is to measure the direction and intensity of $\gamma$-rays and to cause the appearance of the distribution diagram of the radioactivity on the screen of the Braun tube in accordance with these measurement values.

The attached drawings show an embodiment of the apparatus of this invention.

FIGURE 1 is a perspective view of this detector;
FIGURE 2 is a cross-sectional plan view of this same detector, showing its position when it has been brought in line with the direction R of the radioactive source;
FIGURE 3 shows the two types of patterns A and B that appear on the observation screen of the Braun tube; and FIGURE 4 is a block-diagram showing the electrical circuit and transmission mechanism connecting the detector and the Braun tube used for observation.

In FIGURES 1 and 2, 1 is the cylindrical-shaped scintillation crystal, for example, a radio sensitive solid or other liquid such as sodium iodide, which is mounted on the central axis of the cylindrical vessel 2. The inside of this vessel 2 is provided with a photo-multiplier 6 and a number of electronic tubes (not shown in the figures). When the crystal 1 is caused to emit light by means of $\gamma$-rays coming from source R of radioactive ores and the like, an impulse of electrical potential is produced. This cylindrical vessel 2 is arranged with suitable clearance in the bore 10 of the thick lead shield 3. This shield 3 is made to rotate around the axis of the vessel 2 by means of a bearing 12 disposed at the bottom of said shield 3. The shield 3 is provided with two elongated walls 4 and 5. The $\gamma$-rays from the radioactive source R of the ore to be mined passes through the gap 11 between the elongated walls 4 and 5 and then the aperture 9 and reaches the aforementioned radio sensitive crystal 1 after penetrating the walls of the vessel 2. The width of the gap 11 between the elongated walls 4 and 5 and that of the aperture 9 is made to be equal to the diameter of the cylindrical crystal 1, and the length of the elongated walls 4 and 5 are suitably designed to meet the requirements for the accuracy desired in determining the direction of the source R and the sensitiveness required of the detector. Moreover, upwards and downwards from the aperture 9 inclined walls are formed, which are for limiting the angle of incidence of the $\gamma$-rays coming into the aperture 9. Since the foregoing shield 3 is designed to rotate at a given speed with the vertical axis of the stationary cylindrical vessel as its center, if the shield 3 of the detector is rotated, the radioactive rays from all directions around the point at which the detector has been set are introduced successively into the crystal 1 via the gap 11 between the elongated walls 4 and 5 and the aperture 9. The crystal 1 is caused to emit light and this change is then converted into impulses of electric potential by means of the photoelectric amplifier 6 and the electronic tubes for transmission to the Braun tube used for observation. On this occasion, since the shield 3 is constructed of lead of suitable thickness as described above, only the $\gamma$-rays that are in line with the direction that the gap 11 between the elongated walls 4 and 5 and the aperture 9 is facing during the rotation of the above shield hits the crystal 1 strongly. As shown in FIGURE 4, the shield 3 of the detector is rotated by means of shaft 15 coupled through gear 14 to gear 13 on the motor shaft. This shaft 15 simultaneously rotates the synchronous generator 18 through gears 16 and 17. This generator 18 is coupled electrically with a synchronous motor 19 which is for rotating by transmission through gears 20 and 21 the deflection coil 22 of the Braun tube 23 used for observation. By this means the detector and the deflection coil 22 rotate synchronously.

The circuit for transmitting the impulse from the detector 2 and 3 to the Braun tube 23 is constituted as shown in FIGURE 4 to build up the image that appears on the screen of the Braun tube. The principal function of this circuit consists of three systems; the first is a system that automatically forms the coordinates that become the basis for causing coordinate-lines 40 and 41, which are shown in both Patterns A and B of FIGURE 3, to appear on the screen of the Braun tube; the second is a system as in Pattern A of FIGURE 3 which is a counter-type indicator which shows the survey data by means of dots; and the third is a system of the type in which the survey data are shown by a continuous curve as in Pattern B of FIGURE 3. In performing the survey, since by the function of the above circuit, either the survey data by the first and second systems as shown in FIGURE 3A or the survey data by the first and the third systems as shown in FIGURE 3B are observed on the screen of the Braun tube, the source and the direction of the γ-rays can be detected.

Around the perimeter of the screen of the Braun tube the points of the compass 30 are provided. Since by this, with the N-direction being 0° (360°), the angle $\theta$ is indicated, the examples illustrated in Patterns A and B of FIGURE 3 indicate that the most intense radioactive source lies in the westward direction (272°) followed by those in and eastward direction (98°) and southward direction (185°). This type of survey is performed at two different points suitably separated and the directions of the source are drawn on the map to obtain the point of intersection by which the location of the source is determined.

What is claimed is:

1. A surveying apparatus for radioactive sources, comprising a detector which perceives the direction and intensity of γ-rays, and a Braun tube for observing the changes in the electrical potential of impulses resulting from the perception of said γ-rays by said detector, said detector consisting of a cylindrical vessel, a crystal, which emits light when exposed to γ-rays, contained within said vessel, a photoelectric amplifier and electrical equipment adjoined thereto adapted to transmit electrical impulses, caused by irradiation of said crystal, to said Braun tube, and a lead shield substantially surrounding said cylindrical vessel, said shield being rotatably supported with the axis of said cylindrical vessel as the axis of rotation of said shield, means to rotate said shield about said vessel, said shield being irregular in shape and having an aperture therein, a pair of elongated walls having a gap therebetween, said walls extending longitudinally from said shield on either side of said aperture to form a radial slot leading to said aperture, the width of said gap and the width of said aperture being equal to the diameter of said cylindrical vessel, whereby γ-rays emitted from a remote radioactive source will pass through said aperture in said shield and will irradiate said crystal, causing electrical impulses to be transmitted to said Braun tube for observation.

2. Apparatus according to claim 1, wherein the slot formed by said walls has inclined upper and lower walls for limiting the angle of incidence of the γ-rays coming into said aperture.

References Cited in the file of this patent

UNITED STATES PATENTS

| | | |
|---|---|---|
| 2,562,929 | Lord et al. | Aug. 7, 1951 |
| 2,856,536 | Cardwell et al. | Oct. 13, 1958 |
| 2,875,347 | Anderson et al. | Feb. 24, 1959 |
| 2,883,548 | Baker et al. | Apr. 21, 1959 |
| 2,888,568 | Jones et al. | May 26, 1959 |
| 2,990,475 | Scherbatskoy | June 27, 1961 |